United States Patent
Hujer et al.

(10) Patent No.: US 9,475,541 B2
(45) Date of Patent: Oct. 25, 2016

(54) BRAKE AND METHOD FOR THE INSTALLATION THEREOF

(71) Applicant: Gustav Magenwirth GmbH & Co. KG, Bad Urach (DE)

(72) Inventors: Joachim Hujer, Grabenstetten (DE); Stefan Ruckh, Römerstein (DE)

(73) Assignee: Gustav Magenwirth GmbH & Co. KG (DE)

( * ) Notice: Subject to any disclaimer, the term of this patent is extended or adjusted under 35 U.S.C. 154(b) by 145 days.

(21) Appl. No.: 14/058,676

(22) Filed: Oct. 21, 2013

(65) Prior Publication Data
US 2014/0041971 A1     Feb. 13, 2014

Related U.S. Application Data

(63) Continuation of application No. PCT/EP2012/056449, filed on Apr. 10, 2012.

(51) Int. Cl.
  *F16D 51/30*   (2006.01)
  *B62L 1/16*    (2006.01)
  *B62L 1/00*    (2006.01)
  *B62L 3/02*    (2006.01)

(52) U.S. Cl.
  CPC ............ *B62L 1/16* (2013.01); *B62L 1/005* (2013.01); *B62L 3/023* (2013.01); *Y10T 29/49826* (2015.01)

(58) Field of Classification Search
  CPC ......... F16D 51/30; B62L 3/023; B62L 3/08; B62L 1/061; B62L 1/14; B60T 8/42; B60T 8/3225; B60T 11/16
  USPC ................ 188/152, 344; 303/114.1
  See application file for complete search history.

(56) References Cited

U.S. PATENT DOCUMENTS 2,140,752 A * 12/1938 La Brie ............ F16D 51/30
                                                          188/326
3,338,337 A *  8/1967 Freeland ............ B62L 3/023
                                                          188/344

(Continued)

FOREIGN PATENT DOCUMENTS

DE        549087      4/1932
DE       3825394      4/1989

(Continued)

OTHER PUBLICATIONS

International Search Report of PCT/EP2012/056449 dated Jan. 14, 2013.

(Continued)

*Primary Examiner* — Christopher Schwartz
(74) *Attorney, Agent, or Firm* — Mayback & Hoffman, P.A.; Gregory L. Mayback; Rebecca A. Tie

(57) ABSTRACT

A rim brake having a right arm and a left arm respective with one upper and one lower longitudinal portion separated from one another by a pivot bearing. The lower longitudinal portion is provided for holding a brake pad and the upper longitudinal portion engages with at least one hydraulic cylinder through a wedge element. The hydraulic cylinder is disposed between the right arm and the left arm and is configured to move the wedge element. A method for the installation of a hydraulic brake having a master unit and a slave unit connected to a hydraulic line is also provided.

13 Claims, 8 Drawing Sheets

(56) References Cited

U.S. PATENT DOCUMENTS

| | | | | |
|---|---|---|---|---|
| 3,899,057 | A * | 8/1975 | Carre | B60T 11/16 188/196 C |
| 4,090,739 | A * | 5/1978 | Iio | B60T 8/3225 303/10 |
| 5,368,136 | A * | 11/1994 | Walte | B62L 1/14 188/2 D |
| 5,417,481 | A * | 5/1995 | Megerle | B60T 8/42 138/42 |
| 5,678,665 | A * | 10/1997 | Debreczeni | B60T 11/16 188/196 M |
| 6,374,957 | B1 * | 4/2002 | Krumbeck | B62L 1/10 188/24.12 |
| 6,651,790 | B2 * | 11/2003 | Juan | B62L 3/08 188/151 A |
| 2010/0200340 | A1 | 8/2010 | Valembois | |
| 2011/0290595 | A1 * | 12/2011 | Nago | B60T 1/06 188/24.22 |
| 2012/0067802 | A1 * | 3/2012 | Irvin | B03C 1/0332 210/222 |

FOREIGN PATENT DOCUMENTS

| | | |
|---|---|---|
| DE | 4237110 | 5/1994 |
| EP | 0023414 | 10/1983 |
| EP | 0575720 | 12/1993 |
| FR | 2621003 | 3/1989 |

OTHER PUBLICATIONS www.magura.com, "Workshop 2011," copyrighted 2010.

* cited by examiner

BRAKE AND METHOD FOR THE INSTALLATION THEREOF

CROSS REFERENCE TO RELATED APPLICATION

This is a continuing application, under 35 U.S.C. §120, of copending international application No. PCT/EP2012/056449, filed Apr. 10, 2012, which designated the United States and was not published in English; this application also claims the priority, under 35 U.S.C. §119, of German patent application No. 10 2011 007 652.2, filed Apr. 19, 2011; the prior applications are herewith incorporated by reference in their entirety.

STATEMENT REGARDING FEDERALLY SPONSORED RESEARCH OR DEVELOPMENT

Not Applicable

FIELD OF THE INVENTION

The invention relates to a rim brake having a right arm and a left arm with, respectively, one upper and one lower longitudinal portion separated from one another by a pivot bearing. The lower longitudinal portion is provided for holding a brake pad and the upper longitudinal portion engages with at least one hydraulic cylinder. Such rim brakes are used for decelerating muscle-powered vehicles, for example, bicycles, scooters or tricycles.

The invention also relates to a hydraulic vehicle brake having a master unit and a slave unit that are connected to a hydraulic line, the hydraulic line being filled with a hydraulic fluid. The invention furthermore relates to a method for the installation of a hydraulic brake with a master unit and a slave unit that are connected to a hydraulic line, comprising the following steps: severing the hydraulic line, installing the master unit on the vehicle, installing the slave unit on the vehicle, laying the hydraulic line on the vehicle, and connecting the master unit and/or slave unit to the hydraulic line.

BACKGROUND OF THE INVENTION

German Patent Application DE 42 20 854 A1 discloses a prior art rim brake. In this brake, the hydraulic cylinder is disposed substantially horizontally, so as to be fastened with one end to the right arm and with the other end to the left arm. As a result, this brake has a large structural space and poor aerodynamics with a large amount of air turbulence. Furthermore, this rim brake has the disadvantage that, during installation on the vehicle, in some installation situations, the brake line must be dismounted from the master unit and/or slave unit and brake fluid can escape from the then free end of the hydraulic line. In this situation, cumbersome deaeration is necessary.

SUMMARY OF THE INVENTION

The present invention provides a rim brake having a smaller structural space and improved aerodynamics.

It is proposed according to the invention that a rim brake be equipped with a right arm and a left arm situated on both sides of the wheel. Each arm has a pivot bearing by which it is rotatably mounted on a static part of the vehicle equipped with the rim brake. During normal operation of the vehicle, the right arm and the left arm are disposed approximately vertically, such that each arm is divided by the pivot bearing into an upper longitudinal portion and a lower longitudinal portion.

The designation "right arm" and "left arm" is used in the present description merely to make a distinction between identical features. The actual configuration on the vehicle may vary depending on whether the vehicle brake is in a leading or trailing configuration or installed on the vehicle at the front wheel or at the rear wheel.

Each of the arms may be produced in one piece, for example, as a forged part or as a fiber-reinforced plastic part. In other embodiments of the invention, an arm may be a multi-part configuration and have at least one joint, for example, at the pivot bearing or at at least one of its ends. The joint may be formed by soldering, welding or adhesive bonding.

According to the invention, the hydraulic cylinder required for moving the arms is disposed between the right arm and the left arm. This means that the hydraulic cylinder, the right arm, and the left arm are disposed approximately parallel to one another in an upright configuration and the hydraulic cylinder is disposed approximately in the plane spanned by the wheel of the vehicle.

Provided between the hydraulic cylinder and at least one portion part of the upper longitudinal portion of the right and/or left arm is a wedge element through which the hydraulic cylinder and at least one arm of the rim brake are in engagement with one another. For this purpose, the hydraulic cylinder is configured to move the wedge element upward and downward along its movement direction. The spacing between the upper longitudinal portions of the arms varies in accordance with the position of the wedge element. Through the pivot bearing, this leads to a decrease or increase in the spacing between the lower longitudinal portions of the arms. If the lower longitudinal portions of the arms each bear a brake pad, these are moved with a predefinable force against the rotating friction partner, generally the rim flank, in order to generate a braking force.

In some embodiments of the invention, the pivot bearings are fastened to the vehicle frame, for example, as soldered-on parts. This makes it possible for the proposed rim brake to be used as a replacement part for a mechanical U-brake or V-brake such as is known per se.

In some embodiments of the invention, the upper longitudinal portion of the right or left arm is in sliding connection with the wedge element so that the spacing between the upper longitudinal portions can be increased or decreased as a result of a sliding movement up or down the wedge element. To decrease friction and/or wear, the wedge element and/or that portion part of the upper longitudinal portion of the arms that is in contact with the wedge element may be provided with a coating or a sliding element. A coating may comprise a hard chromium plating or a layer of diamond-like carbon. A sliding element may be composed of a ductile metal or an alloy (for example, brass or bronze) or of a polymer (for example, polyoxymethylene or polytetrafluoroethylene). In some embodiments of the invention, the wedge element may be provided with a lubricant, for example, a grease, an oil, or silicone.

In some embodiments of the invention, the upper longitudinal portions of the arms may bear respectively at least one roller that, during a movement of the wedge element, can roll on a flank of the wedge element. In this way, the friction between the wedge element and the arms is minimized so that a large braking force can be attained with a low actuating force. Furthermore, in such an embodiment, the wear of the wedge element and/or of the upper longitudinal portion of the arms can be reduced to lengthen the service life of the rim brake.

In some embodiments of the invention, the roller may be equipped with a plain bearing, for example, a slide bush, which comprises a ductile metal or an alloy or a polymer. The slide bush may, in some embodiments of the invention, comprise brass, bronze, polytetrafluoroethylene, or polyoxymethylene. In other embodiments of the invention, the at least one roller may be provided with an antifriction bearing, for example, a roller bearing or a ball bearing. Friction is further reduced in this way so that increased braking power can be attained.

In some embodiments of the invention, the wedge element may have at least one first flank and at least one second flank that run in different planes, wherein the right arm engages with the first flank and the left arm engages with the second flank. Such an embodiment permits a symmetrical transmission of force to the arms to eliminate the action of torques on the pivot bearings.

In some embodiments of the invention, at least one flank of the wedge element may have a contour that is concave at least in sections and/or convex at least in sections and/or straight at least in sections. In this way, the characteristic of the brake, that is to say the generated braking force as a function of the actuating force applied to the brake lever by the rider, can be adapted to different track profiles, different fields of application or different rider preferences. In some embodiments of the invention, different wedge elements may be marketed as a set so that the user of the rim brake can select and exchange the wedge elements in accordance with their preferences.

In some embodiments of the invention, the rim brake furthermore comprises a spring element that acts on at least one arm so that the brake pad can be moved against the rotating friction partner counter to the spring force. Such a feature ensures that, when the brake is released, the arms are moved back by the spring force into their starting position to have the brake assume its open position without further user intervention.

In some embodiments of the invention, the spring element may be a spiral spring that is disposed concentrically around the journal of the pivot bearing. This permits a protected installation position so that the brake is affected to a lesser extent by dust and moisture.

In some embodiments of the invention, the spring element may comprise a leaf spring that is fastened to an immovable part of the vehicle or to an immovable part of the rim brake and to the upper and/or lower longitudinal portion of the arm. Such a leaf spring permits a compact design of the pivot bearing to allow the rim brake to have an aerodynamic, elegant appearance.

In some embodiments of the invention, the pivot bearing may be disposed on a support that can be connected to the frame of a vehicle. This permits simple fastening to the frame using only one fastening screw, and also permits the exchange of conventional mechanical rim brakes for the rim brake according to the invention. Furthermore, such an embodiment eliminates the need for special attachment parts on the frame, thus permitting a broad range of applicability to different vehicle models.

In some embodiments of the invention, the leaf spring may be fastened to the support and to the upper longitudinal portion of the arm. This yields a compact design in which all parts are captively fastened to the rim brake so that said parts do not become detached during transportation, sale, and installation.

In some embodiments of the invention, the support may have a first web and a second web, wherein a journal of the pivot bearing is held both in the first and also in the second web. In this way, the occurrence of a bending moment acting on the fastening of the pivot bearing in the support is eliminated so that the pivot bearing has greater stability and the braking force can be increased. Furthermore, the central web may serve for fastening and/or for supporting the hydraulic cylinder.

In some embodiments of the invention, the hydraulic cylinder may be a double-acting hydraulic cylinder so that the arms can be moved hydraulically in both movement directions. In this way, the rim brake can, without a spring element, be moved from an open position into a closed position and from the closed position back into the open position.

In some embodiments of the invention, at least one of the arms may have a concave inner side that at least partially encloses the hydraulic cylinder. This yields an aerodynamically expedient casing around the hydraulic cylinder and/or the wedge element so that the air resistance of the proposed rim brake is further reduced.

In some embodiments of the invention, a method for the installation of a hydraulic brake is proposed. Here, the hydraulic brake comprises at least one master unit and one slave unit that are connected to a hydraulic line. The master cylinder, the slave cylinder, and the hydraulic line are filled with an incompressible liquid as hydraulic fluid, for example, a liquid with at least one mineral oil or at least one silicone oil or at least one alcohol or a mixture of several polyglycols. For the functioning of the hydraulic brake, it is necessary for no air inclusions, or no air inclusions of a certain predefinable size, to be present in the hydraulic line, the master cylinder, or the slave cylinder. The stated components master unit, slave unit, and hydraulic line are usually already connected to one another and filled with the hydraulic fluid as part of the production process at the factory. This firstly permits simple installation on the vehicle by the end user or the manufacturer of the vehicle, and permits operation of the brake for test purposes at the final inspection station or for the purposes of quality control.

If the hydraulic brake is a disc brake, the slave unit may comprise a disc brake caliper that can be fastened, for example, to the fork tube or to the rear structure of a bicycle so that at least one brake pad can be placed in contact with a disc brake. If the hydraulic brake is a rim brake, the slave unit can be fastened at both sides of the wheels so that at least one brake pad can be placed in contact with the rim flanks.

For the installation of the hydraulic brake on the vehicle, the master unit is installed at a location accessible to the rider so that, during operation of the vehicle, the rider can build up a brake pressure in the hydraulic line by the master unit. The slave unit is then installed on the vehicle to be placed in engagement with a rotating friction partner in order to generate the required braking force. Finally, the hydraulic line is laid on the vehicle so that it does not hinder the movement of movable vehicle parts and cannot be damaged during normal operation of the vehicle.

In some installation situations, it may be helpful for the installer to separate the master unit and/or the slave unit from the hydraulic line to facilitate installation or actually permit installation in the first place. In these cases, in known installation processes, there was the risk of hydraulic fluid escaping from the hydraulic line at the separation point, resulting in air inclusions impairing the function of the hydraulic brake after installation on the vehicle. If the air inclusion is identified, the hydraulic brake can duly be deaerated, but this constitutes an additional working step.

It is now proposed according to the invention that the internal cross-section of the hydraulic line be reduced in at least one longitudinal portion. In some embodiments of the invention, this may be realized by squeezing or compressing the hydraulic line. In other embodiments of the invention, the hydraulic line may be welded, for example, by thermal welding, laser welding, or ultrasound welding. In some embodiments of the invention, the hydraulic line can be firstly compressed and then welded.

In the context of the present description, the internal cross-section is to be understood to mean the cross-sectional area of the hydraulic line through which the hydraulic fluid flows during operation of the vehicle brake. In the context of the present description, the reduced internal cross-section is to be understood to mean the internal cross-section of the squeezed, pressed and/or welded longitudinal portion of the hydraulic line which prevents or at least hinders the throughflow of the hydraulic fluid.

In some embodiments of the invention, the reduction of the internal cross-section may take place multi-dimensionally, such that the external cross-section of the longitudinal section with reduced internal cross-section is of approximately polygonal form. In this case, the external cross-section of the longitudinal portion with reduced internal cross-section cannot exceed the original diameter of the hydraulic line, that is to say the circumscribed circle of the polygonal cross-section is smaller than the original diameter.

The reduction in the internal cross-section may take place immediately before the installation of the hydraulic brake on the vehicle. In other embodiments of the invention, the reduction of the internal cross-section may take place after the manufacture and functional testing of the hydraulic brake at the factory, such that the installer need merely sever the line at the intended point in order to be able to install the hydraulic brake on the vehicle. In this case, the hydraulic line may be severed at or adjacent to the longitudinal portion with reduced internal cross-section without the hydraulic fluid escaping from the hydraulic line.

After the installation of the master unit, the slave unit and the hydraulic line on the vehicle, the at least one longitudinal portion with reduced internal cross-section can be severed from the hydraulic line. The remaining line length with the original internal cross-section can then be connected to the master unit or the slave unit such that the function of the hydraulic brake is restored. In this way, the installation of the hydraulic brake can be carried out without the risk of an undesired escape of hydraulic fluid from the open end of the hydraulic line. Since the hydraulic line must be shortened by the longitudinal portion with reduced internal cross-section in any case before being reconnected to the master unit or slave unit, the hydraulic line can simultaneously be cut to the required length such that there is no excess line length remaining on the vehicle. This simultaneously improves the functioning and the aesthetics of the vehicle and of the brake system.

In some embodiments of the invention, at least one longitudinal portion with reduced internal cross-section may be disposed in the vicinity of the master unit and/or in the vicinity of the slave unit. Accordingly, for installation of the vehicle, the hydraulic line can be severed in the vicinity of the master unit before being connected to the master unit again after installation has taken place, or severed in the vicinity of the slave unit before being connected to the slave unit again after installation. In some embodiments of the invention, the hydraulic line may be severed at both sides, and, thus, laid or installed on the vehicle completely independently of the master unit and slave unit.

In some embodiments of the invention, the longitudinal portion of reduced internal cross-section is at a distance of approximately 1 cm to approximately 15 cm from the master unit and/or from the slave unit. This permits good accessibility with a suitable tool for severing the hydraulic line before installation. Secondly, the line length remaining after the severing process is adequate to permit the reconnection of the master unit and slave unit in most applications, and to keep the amount of waste material low.

In some embodiments of the invention, the internal cross-section may be reduced in two longitudinal portions that are at a distance of approximately 0.5 cm to approximately 3 cm from one another. In this case, the hydraulic line can be severed between the two longitudinal portions such that both ends are protected against the loss of hydraulic fluid. This permits particularly reliable reconnection of the hydraulic line, because there are no air inclusions in the two components to be connected.

In some embodiments of the invention, the laying of the hydraulic line on the vehicle may take place by virtue of the line being conducted through at least one orifice in a frame tube of the vehicle. In this case, during operation of the vehicle, the hydraulic line is in a protected location in the interior of the frame tube. For this purpose, the frame tube has two orifices which may be disposed in the vicinity of the master unit and in the vicinity of the slave unit or close to the two ends of the frame tube, for example the top tube, the down tube, or a rear stay of a bicycle, and through which the hydraulic line enters and exits. In this case, the method according to the invention permits particularly reliable installation because the hydraulic line is protected against loss of hydraulic fluid even when the free end thereof impacts against the inside of the frame tube during installation.

In some embodiments of the invention, the reduced internal cross-section may have a diameter of less than 0.5 mm, less than 0.3 mm, or less than 0.1 mm. In some embodiments of the invention, the reduced internal cross-section may be completely closed, such that the escape of hydraulic through the reduced internal cross-section is prevented completely.

Although the invention is illustrated and described herein as embodied in a brake and method for the installation thereof, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE EMBODIMENTS

Figure 1:
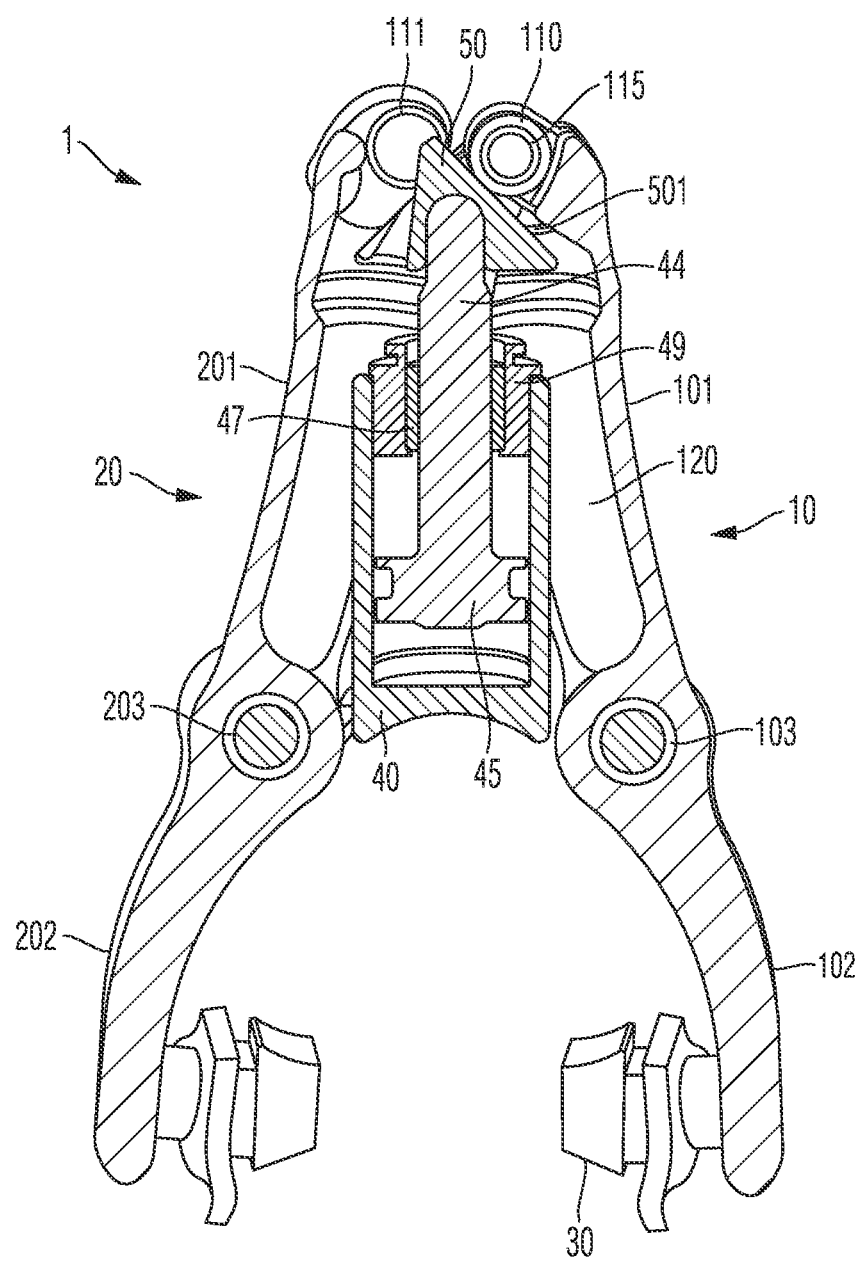
FIG. 1 is a longitudinal cross-sectional view through a rim brake according to the present invention.
Figure 2:
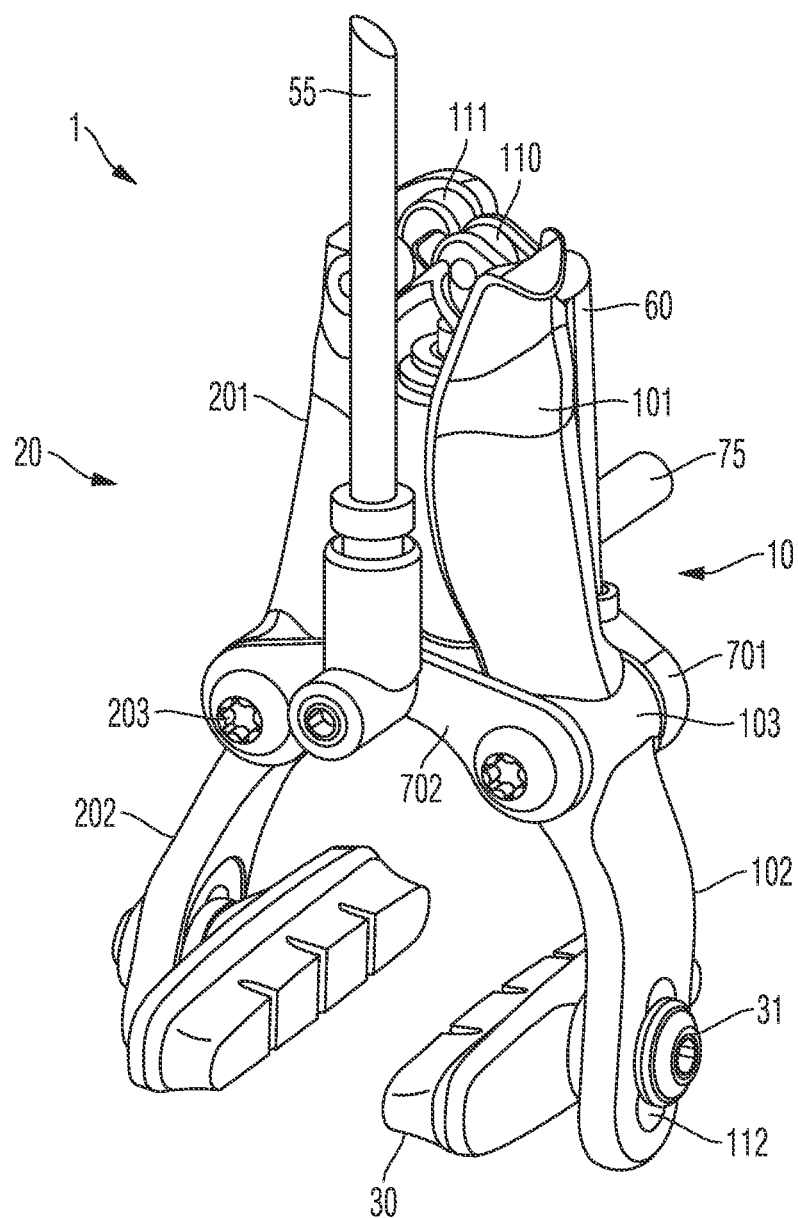
FIG. 2 is a fragmentary, perspective view of the rim brake of FIG. 1 from a side facing away from a frame.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIGS. 1 through 4, there is shown a first exemplary embodiment of a rim brake having a right arm 10 and a left arm 20. Here, the terms "right" and "left" have been selected merely by way of example in order to express that the arms are disposed on both sides of the rotating friction partner. The actual sides at which the right and left arms 10, 20 are installed on the vehicle changes depend on whether the rim brake 1 is fastened to the frame of the vehicle in a trailing or leading configuration.

Each arm has an upper longitudinal portion 101, 201 and a lower longitudinal portion 102, 202. Between the two longitudinal portions there is disposed a pivot bearing 103, 203. In some embodiments of the invention, the upper longitudinal portion 101, the outer housing of the pivot bearing 103 and the lower longitudinal portion 102 may be produced in one piece, for example, as a cast or forged part. In some embodiments of the invention, the right arm 10 and/or the left arm 20 may be produced from an aluminium alloy or a magnesium alloy or a high-grade steel. In other embodiments of the invention, the arms 10, 20 may be produced from fiber-reinforced plastic, for example, carbon fibers impregnated with an epoxy resin.

In some embodiments of the invention, the pivot bearings 103, 102 may be fastened to the bicycle frame, for example, as soldered-on plinths. In the embodiment shown in FIGS. 1 to 4, the pivot bearings 103, 203 are disposed on a support 70, which can be connected to the frame of a vehicle. For this purpose, there is provided on the support 70 a threaded bolt 75 that can be guided through a corresponding bore on the frame of the vehicle and screwed to a nut. The support 70 makes it possible for mechanical rim brakes known per se to be exchanged for the brake according to the invention because no additional attachment parts whatsoever need to be fastened to the frame of the vehicle.

The lower longitudinal portions 102, 202 of the arms 10, 20 respectively bear one brake pad 30 that, as a static friction partner, is moved against the rotating friction partner and causes a reduction in the speed of the vehicle through the friction force generated. In some embodiments of the invention, the brake pad 30 may be composed of a rubber mixture. The brake pad 30 may, in a manner known per se, have a profiling for dissipating water, such that braking performance is maintained even in wet weather.

The brake pad 30 may be fastened to the arm 10 or 20 by a fastening screw 31. For this purpose, slots 112, 212 may be disposed in the arms 10, 20 such that the brake pad 30 can be moved, and thereby adjusted, for adaptation to different frame sizes, different rim heights, and different frame geometries.

The upper longitudinal portion 101, 201 of the arms 10, 20 has a convex outer contour and a concave inner form 120 such that the arms 10, 20 at least partially surround the hydraulic cylinder 40. This serves for improved aerodynamics and, in other embodiments of the invention, may also be designed differently. The hydraulic cylinder 40 has a cylindrical basic body 46. A piston 45 is held in a linearly movable manner in the basic body 46. In some embodiments of the invention, the piston 45 may have a sealing groove 48 in which a seal, composed, for example, of an elastomer, may be accommodated. The piston 45 is connected to a connecting rod 44. In some embodiments of the invention, the connecting rod 44 and the piston rod 45 may be produced in one piece, for example, as a cast part or as a turned part. The hydraulic cylinder 40 is closed off at its upper end by a cover 49 in which a seal 47 is held, which seals off the leadthrough point of the connecting rod 44 through the cover 49. The hydraulic cylinder 40 can be charged with a hydraulic fluid, for example, a mineral oil, through a line 55. This causes the piston 45 to be moved upward.

Disposed on the end of the connecting rod 44 is a wedge element 50. When the piston 45 moves, the wedge element 50 correspondingly moves upwards or downwards with the piston 45.

The wedge element 50 is connected through its flanks 501, 502 to the upper longitudinal portions 101, 201 of the arms 10, 20. Rotatably mounted rollers 110, 111 are provided at the contact points between the arms 10, 20 and the wedge element 50 to permit a low-wear and low-friction rolling movement as the wedge element 50 moves. For this purpose, the rollers 110, 111 may be mounted by plain bearings 115. In other embodiments of the invention, the rollers 110, 111 may also be omitted, such that the upper longitudinal portions 101, 201 of the arms 10, 20 are in sliding connection with the wedge element 50.

During an upward movement of the wedge element 50, the spacing between the upper longitudinal portions 101, 201 of the arms 10, 20 increases. Due to the pivot bearings 103, 203, this movement causes the spacing between the lower longitudinal portions 102, 202 to be decreased, such that the brake pads are moved into a braking position against the rotating friction partner. When the piston 45 with the wedge element 50 is moved downward, the spacing between the upper longitudinal portions 101, 102 decreases, such that the spacing between the lower longitudinal portions 102, 202 increases and the brake pads 30 are released from the rotating friction partner. The brake 1 is then in an open position.

Figure 3:
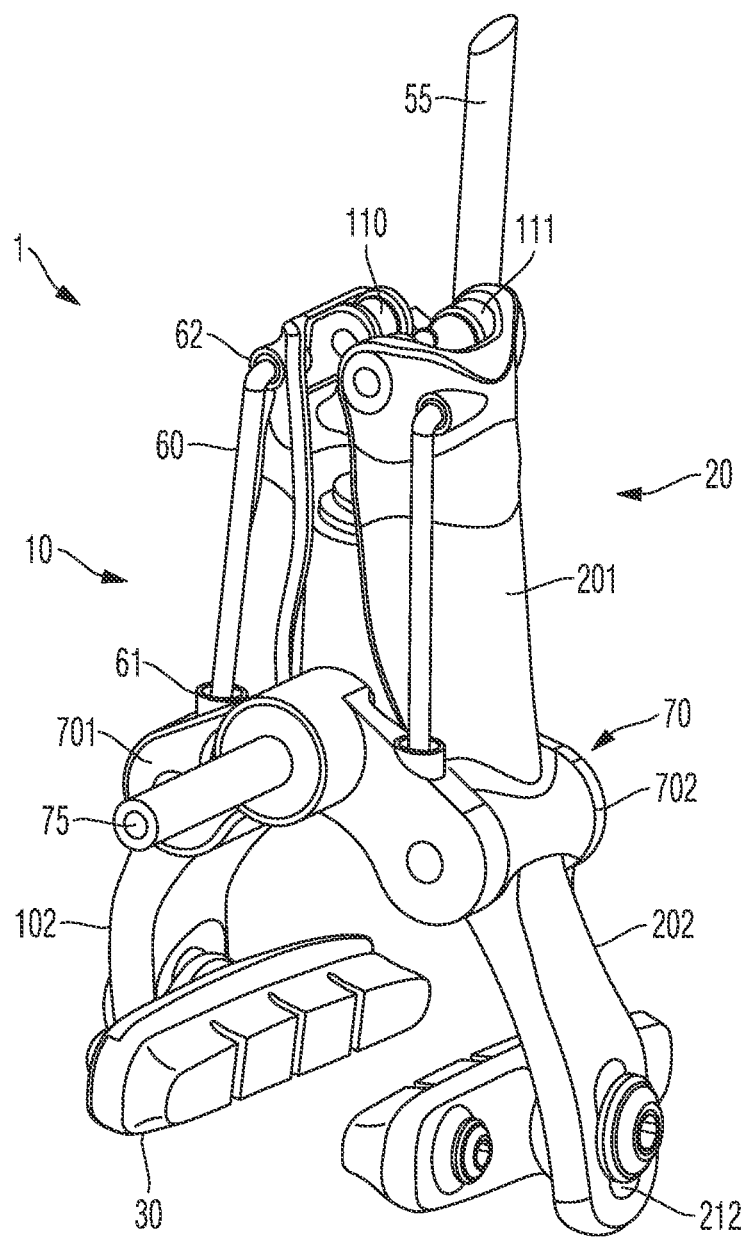
FIG. 3 is a fragmentary, perspective view of the rim brake of FIG. 1 from a fastening side thereof.
Figure 4:
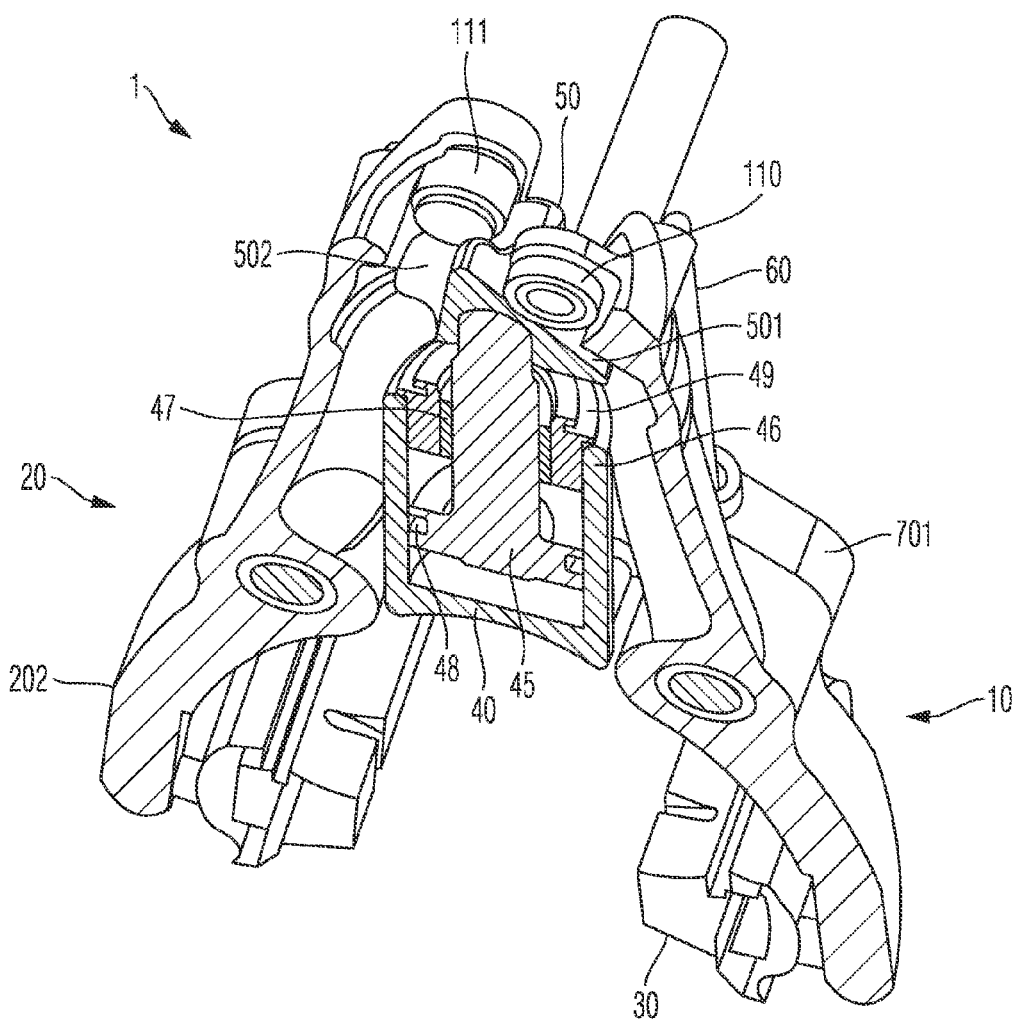
FIG. 4 is a cross-sectional and perspective view of the rim brake of FIG. 1.

So that the brake 1 can be moved reliably into the open position, spring elements 60 are provided. The spring elements 60 are formed as straight leaf springs as shown in FIG. 3. The spring elements 60 are fastened in an orifice 61 on the support 70 and in an orifice 62 on the upper longitudinal portion 101 of the arm 10. During the pivoting of the arms 10, 20, the relative distance between the two bores 61, 62 decreases, such that the spring element 60 is deformed from a more straight position into a more curved, deflected position. The restoring force of the elastic material of the spring element 60 ensures that the brake pads 30 are moved from the braking position into the open position. The invention is self-evidently not restricted to the use of straight spring elements 60. In other embodiments of the invention, to increase the spring force, the spring element may also comprise a spiral spring with at least one winding.

Figure 5:
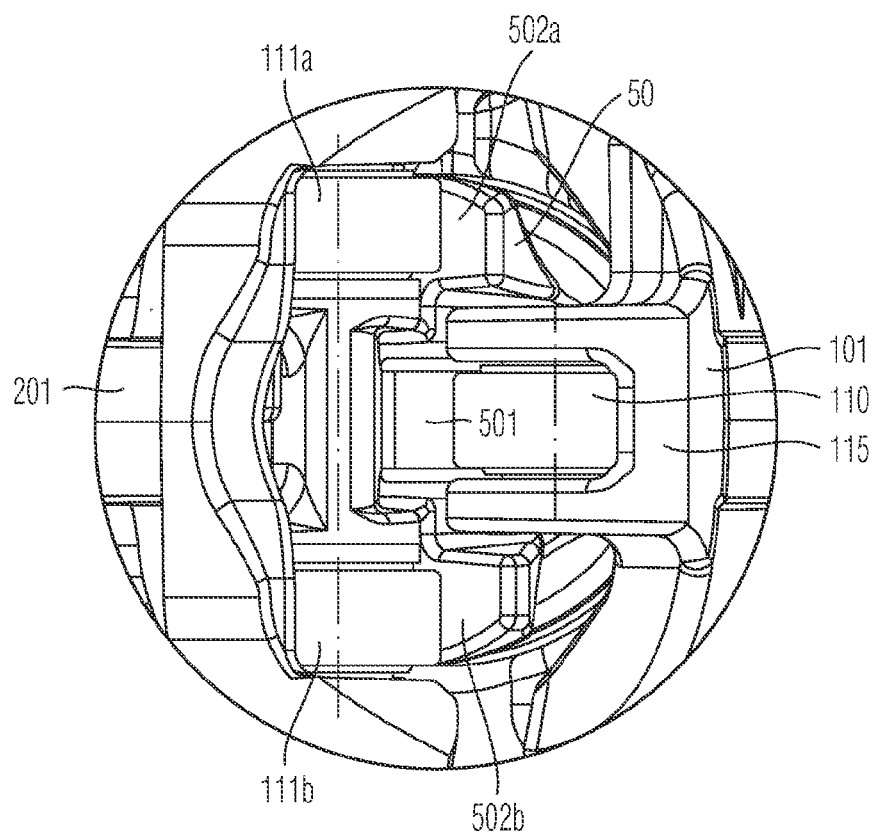
FIG. 5 is an enlarged plan view of a detail of a wedge element and its arms of the rim brake of FIG. 1.

FIG. 5 shows a plan view of the upper longitudinal portions 101, 201 of the arms 10, 20. It can be seen from FIG. 5 that the roller 110 is disposed approximately centrally on the cross-section of the upper longitudinal portion 101 of the right arm 10. The roller 110 is mounted in a fork 115 such that the occurrence of bending moments acting on the bearing arrangement of the roller 110 is prevented. The fork 115 may be produced in one piece with the upper longitudinal portion 101 of the arm 10, for example, as a cast or forged part.

The upper longitudinal portion 201 of the left arm 20 has two rollers 111a, 111b. These, too, are mounted at both sides such that the bearing configuration of the rollers 111 is not subjected to bending moments.

Visible below the rollers 110, 111 is the wedge element 50. The wedge element 50 has a first flank 501, which is in contact with the roller 110, and two second flanks 502a, 502b, on which the associated rollers 111a, 111b roll. In this way, the forces transmitted from the wedge element 50 to the arms 10, 20 are introduced symmetrically into both arms 10, 20 to prevent the occurrence of bending moments acting on the pivot bearings 103, 203. It is, nevertheless, possible for the roller 110 to protrude, with the fork 115, into the intermediate space between the rollers 111a, 111b, and thereby permit a smaller closing angle in the open position.

Figure 6:
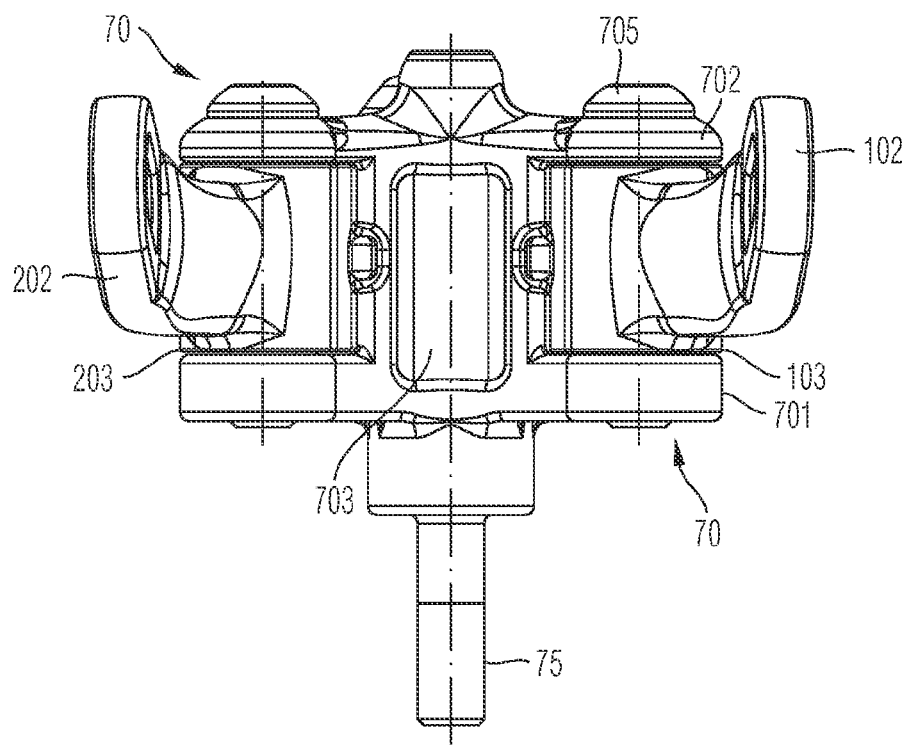
FIG. 6 is a bottom plan view of the rim brake of FIG. 1.

FIG. 6 shows the rim brake in a view from below. In particular, FIG. 6 shows the support 70, which has a first web 701 and a second web 702. The webs 701, 702 are connected by a central web 703. The support 70 may be produced in one piece, for example, from a metal or an alloy or a fiber-reinforced plastic. The support 70 may be produced accordingly as a cast part or as a forged part or laminated in a mold.

Fastened to the support 70 is a threaded bolt 75, by which the support 70 and therefore the rim brake 1 can be fastened to the frame of a vehicle. Also fastened to the support 70 are the pivot bearings 103, 203 which respectively have one rotary journal 705. In some embodiments of the invention, the rotary journal 705 may be guided through a bore in the second web 702 and screwed into a threaded bore in the first web 701. This permits simple installation of the arms 10, and rapid dismounting for servicing work, for example, for cleaning and lubrication of the pivot bearings 103, 203. The central web 703 serves, on the one hand, for connecting the two webs 701, 702. Furthermore, the hydraulic cylinder 40 can be supported with its underside on the central web 703 and thereby transmit to the frame of the vehicle the required opposing force to the movement of the wedge element 50.

Figure 7:
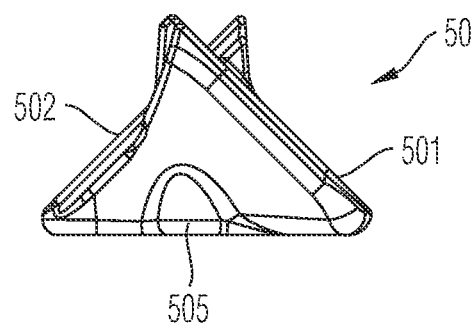
FIG. 7 is a side elevational view of the wedge element of FIG. 1.
Figure 8:
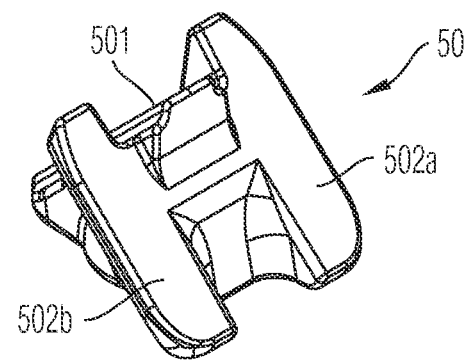
FIG. 8 is a perspective view of the wedge element of FIG. 1.

An embodiment of the wedge element 50 will be explained in more detail based upon FIGS. 7 and 8. The wedge element has, on one side, two second flanks 502a, 502b which, through the rollers 111a, 111b, transmit the force to the second arm 20. Disposed on the opposite side is a single first flank 501 which, through the roller 110, transmits the actuating force to the right arm 10.

The first and second flanks 501, 502 may have concave, convex, or rectilinear longitudinal portions so that the profile of the braking force can be variably selected as a function of the position of the piston.

Furthermore, the wedge element 50 has a fastening orifice 505 by which the wedge element 50 is fastened to the connecting rod 44 of the hydraulic cylinder 40. In some embodiments of the invention, the fastening may be realized by an interference fit or a positively locking fit. In this way, the wedge element 50 can be easily exchanged in order, through the use of different wedge elements, to realize a different response behavior of the rim brake 1 so that the rim brake 1 can be adapted to different track profiles or different preferences of the rider.

Figure 9:
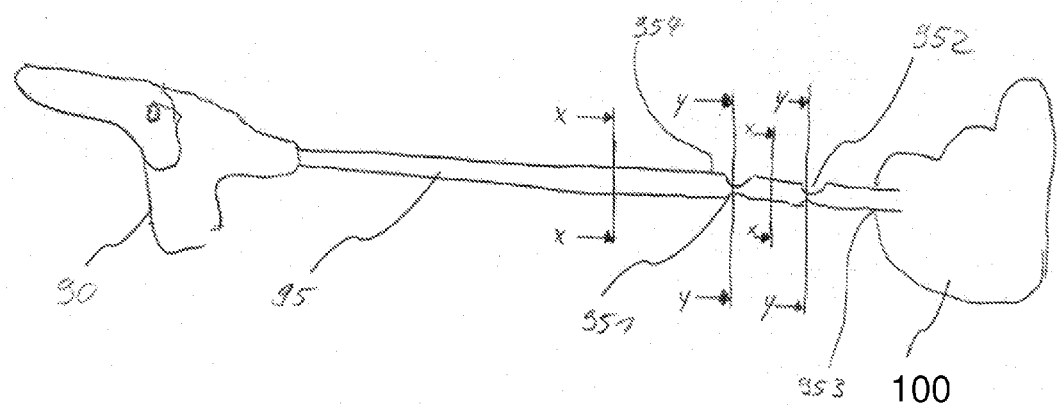
FIG. 9 is a shows a diagrammatic illustration of a hydraulic brake according to the invention.

FIG. 9 shows a schematic illustration of a hydraulic brake. The hydraulic brake as per FIG. 9 can be used, in particular, on muscle-powered vehicles such as, for example, bicycles, recumbents, tricycles, or scooters. The hydraulic brake of FIG. 9 comprises at least one slave unit 100 which constitutes a part of a hydraulic rim brake known per se or of a hydraulic disc brake. The slave unit 100 is designed to move a brake pad against a rotating friction partner, in order thereby to generate a braking force for decelerating the vehicle, as a function of the pressure in the hydraulic system.

The hydraulic brake further comprises a master unit 90. The master unit 90 comprises, in a manner known per se, a hydraulic cylinder that is filled with a hydraulic fluid. The hydraulic cylinder is acted on by a hand-operated lever or a pedal, by which the user of the vehicle can exert a force on the piston of the hydraulic cylinder in order to build up a pressure in the hydraulic system and, thereby, control the braking force.

The pressure or the braking force is transmitted through a hydraulic line 95 that connects the master unit 90 to the slave unit 100. In some embodiments of the invention, the hydraulic line may comprise a polymer material as a fluid-tight sheath or be composed of such a polymer material. In some embodiments of the invention, the length of the hydraulic line 95 may be approximately 80 cm, approximately 170 cm, or approximately 250 cm depending on whether the hydraulic brake is used at the front or the rear wheel of a vehicle and depending on the length of the vehicle.

In some embodiments of the invention, the master unit 90 and the slave unit 100 may already be connected to the hydraulic line 95 at the factory. Likewise, these may already be charged with a hydraulic fluid, for example, a mineral oil, an alcohol, or a mixture of different oils or alcohols, at the factory. This allows the hydraulic brake to be functionally tested before delivery and permits simpler quality control.

To make the installation on the vehicle easier for the purchaser of the hydraulic brake, after the functional test has been carried out, the internal cross-section is reduced in at least one longitudinal portion 951 and/or 952. In some embodiments of the invention, this reduction of the cross-section may be realized by squeezing and/or welding the hydraulic line 95 in the longitudinal portion 951 and/or 952.

Figure 10:
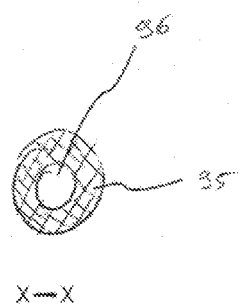
FIG. 10 is a diagrammatic cross-sectional view through a hydraulic line of the hydraulic brake of FIG. 9 in a first longitudinal portion X-X.
Figure 11:
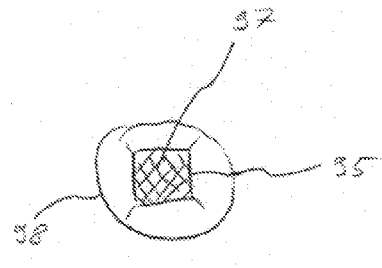
FIG. 11 is a diagrammatic cross-sectional view through the hydraulic line of the hydraulic brake of FIG. 9 at a second longitudinal portion Y-Y.

FIGS. 10 and 11 illustrate the cross-section along the sections X-X and Y-Y. Here, FIG. 10 shows the unchanged internal cross-section 96 of the hydraulic line 95. The cross-section 96 permits an unhindered circulation of the hydraulic fluid so that a braking force can be transmitted from the master unit 90 to the slave unit 100. By contrast, FIG. 11 shows the cross-section in the longitudinal portion 951 or 952. In the exemplary embodiment illustrated, the hydraulic line 95 has been squeezed from two sides so as to yield an approximately square cross-section 97, the clear width of which is smaller than the clear width of the cross-section 96 as in FIG. 10. In some embodiments of the invention, the cross-section 97 may be completely closed off, such that no hydraulic fluid can pass through, a configuration that is shown in FIG. 11. For this purpose, in addition to the compression or squeezing, the cross-section 97 may additionally be welded by heating the polymer material of the hydraulic line 95 until it softens. The welding may be realized through contact with a heated squeezing tool, by ultrasound welding, or by laser welding. Other welding processes not explicitly mentioned here are self-evidently also possible.

Also illustrated in FIG. 11 is the original cross-section 98 of the hydraulic line. As can be seen, in some embodiments of the invention, the cross-section of the hydraulic line 95 in the longitudinal portion 951, 952 is smaller in all directions than the original cross-section 98, such that the hydraulic line 95 can be installed on the vehicle and threaded through narrow orifices in a simple manner without the squeezed and/or welded cross-section posing a hindrance to the lead-through of said hydraulic line. The reduced cross-section 97 is thus smaller or, at most, the same size as the original cross-section 98, or in the case of a polygonal squeezed form, the original round cross-section 98 forms the circumscribed circle for the reduced cross-section 97.

Figure 12:
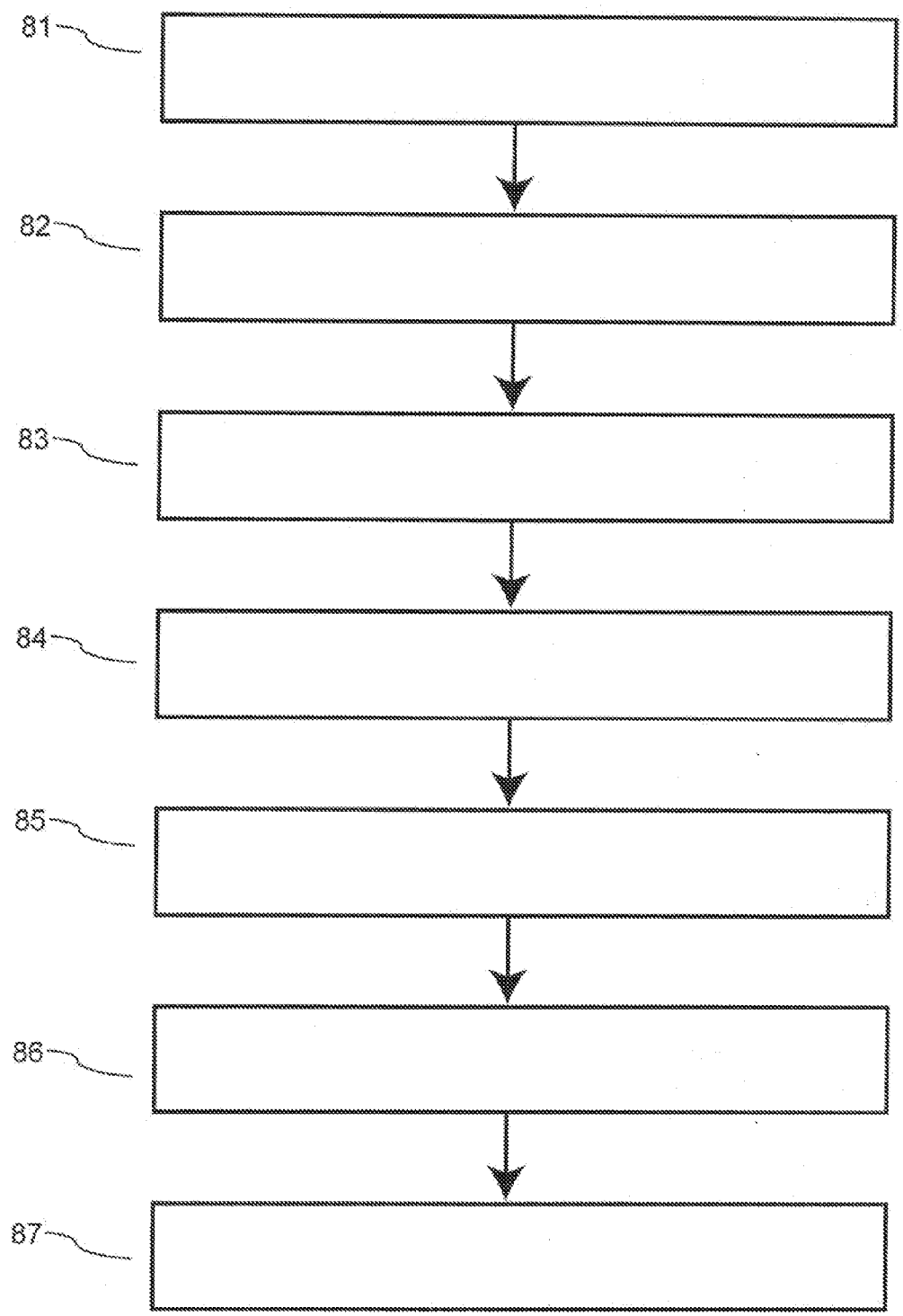
FIG. 12 is a flow diagram of a method according to the invention.

The method according to the invention will be explained once again based upon the flow diagram in FIG. 12. The hydraulic brake is firstly manufactured, subjected to final assembly, and tested in a manner known per se. Then, in the first method step 81, the internal cross-section of the hydraulic line is reduced by squeezing and/or welding in a longitudinal portion 951. The internal cross-section, that is to say, the cross-section available for the flow of the fluid, may thereafter have a diameter of less than 0.5 mm, less than 0.3 mm, less than 0.1 mm, or 0 mm.

This is followed, as an optional second method step 82, by the reduction of the internal cross-section of the hydraulic line in a second longitudinal portion 952. In this case, too, the reduced internal cross-section, that is to say the cross-section available for the flow of the hydraulic fluid, may thereafter have a diameter of less than 0.5 mm, less than 0.3 mm, less than 0.1 mm, or 0 mm. After the first two method steps have been carried out, the flow of the hydraulic fluid in the hydraulic line 95 is thereby prevented entirely or at least considerably restricted. The master unit 90, the slave unit 100, and the hydraulic line 95, nevertheless, are still fixedly connected to one another so that they cannot be separated during possible transportation of the brake to the end user.

In the third method step 83 which then follows, the hydraulic line 95 is severed by sawing or cutting. If the internal cross-section has been reduced in two longitudinal portions 951, 952, the severing takes place preferably between these longitudinal portions. In another case, the hydraulic line 95 may be severed at a point between the longitudinal portion 951 and the slave unit 100 or between the longitudinal portion 951 and the master unit 90.

In method step 84, the master unit is installed at its final position on the vehicle.

In the method step 85, the slave unit is installed at its final position on the vehicle.

In the method step 86, the hydraulic line 95 is laid between the master unit and the slave unit. This method step may include leading the hydraulic line through at least one orifice in a frame tube. Here, if the free end of the hydraulic line 95 comes into contact with or abuts against the frame tube or is subjected to vibrations, it is nevertheless not possible for hydraulic fluid to escape because the cross-section has been reduced in the longitudinal portion 951 and/or in the longitudinal portion 952. It is self-evidently possible for the fourth, fifth and sixth method steps 84, 85 and 86 to be carried out in some other sequence.

Finally, in method step 87, the hydraulic line 95 is severed again at the severing point 954. Furthermore, the hydraulic line is opened up at the connection point 953 of the slave unit 100. The longitudinal portion between the severing point 954 and the connection point 953 is discarded as waste. Finally, the hydraulic line 95 can be connected to the slave unit 100 to establish functionality. The hydraulic brake is, therefore, installed on the vehicle and ready for use, without the need to carry out renewed filling and/or deaeration of the hydraulic system.

The solution principle disclosed in the above description self-evidently also permits modifications without departing from the general concept of the invention. The above description should therefore be regarded not as having a limiting effect but rather as being explanatory. The claims below should be understood as meaning that a stated feature is present in at least one embodiment of the invention. This does not rule out the presence of further features. Where the claims and the description define "first", "second", "third" and "fourth" features, this designation serves to make a distinction between identical features, without specifying a sequence.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described.

All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

We claim:

1. A rim brake for a vehicle, comprising:
   a wedge element;
   left and right arms each respectively having:
      a pivot bearing; and
      one upper longitudinal portion and one lower longitudinal portion separated from one another by the pivot bearing;
   at least one hydraulic cylinder disposed between the right arm and the left arm and configured to move the wedge element;
   the lower longitudinal portion being configured to hold a brake pad; and
   the upper longitudinal portion configured to engage with the at least one hydraulic cylinder through the wedge element.

2. The rim brake according to claim 1, wherein:
   the wedge element has a flank; and
   the upper longitudinal portion of the right and left arms respectively bear at least one roller that, during a movement of the wedge element, rolls on the flank of the wedge element.

3. The rim brake according to claim 2, wherein the roller is equipped with a plain bearing.

4. The rim brake according to claim 1, wherein the wedge element has at least one first flank and at least one second flank running in different planes, the right arm engaging with the first flank and the left arm engaging with the second flank.

5. The rim brake according to claim 4, wherein at least one of the first and second flanks of the wedge element has a contour that is at least one of:
   concave at least in sections;
   convex at least in sections; and
   straight at least in sections.

6. The rim brake according to claim 1, further comprising at least one spring element that acts on at least one of the left and right arms to move the brake pad against a rotating frictional partner counter to a force of the spring element.

7. The rim brake according to claim 6, wherein:
   the vehicle has an immovable part; and
   the spring element comprises a leaf spring that is fastened:

to one of the immovable part of the vehicle and an immovable part of the rim brake; and to at least one of the upper and lower longitudinal portions of the arm.

8. The rim brake according to claim 7, further comprising a support configured to be connected to a frame of a vehicle, the pivot bearing being disposed on the support, the leaf spring being fastened to the support and to the upper longitudinal portion of the arm.

9. The rim brake according to claim 1, further comprising a support configured to be connected to a frame of a vehicle, the pivot bearing being disposed on the support.

10. The rim brake according to claim 9, wherein:

the support has a first web and a second web; and the pivot bearing has a journal held both in the first web and in the second web.

11. The rim brake according to claim 10, wherein the support has a central web connecting the first web and the second web to one another.

12. The rim brake according to claim 1, wherein at least one of the right and left arms has a concave inner side at least partially enclosing the at least one hydraulic cylinder.

13. The rim brake according to claim 1, wherein the rim brake is a brake for at least one of a bicycle, a recumbent bicycle, a scooter, and a tricycle.

* * * * *